United States Patent

Cluff

[11] Patent Number: 5,954,775
[45] Date of Patent: Sep. 21, 1999

[54] DUAL RATE COMMUNICATION PROTOCOL

[75] Inventor: Charles A. Cluff, Zionsville, Ind.

[73] Assignee: Delco Electronics Corp., Kokomo, Ind.

[21] Appl. No.: 08/795,999

[22] Filed: Feb. 5, 1997

[51] Int. Cl.⁶ .................................................. B06R 21/32
[52] U.S. Cl. ........................... 701/45; 280/732; 280/735; 180/268; 180/272
[58] Field of Search ............................... 701/45; 280/735, 280/732; 180/268, 272

[56] References Cited

U.S. PATENT DOCUMENTS

| | | | |
|---|---|---|---|
| 5,398,185 | 3/1995 | Omura | 701/45 |
| 5,528,698 | 6/1996 | Kamei et al. | 701/45 |
| 5,749,059 | 5/1998 | Walton | 701/45 |
| 5,848,802 | 12/1998 | Breed et al. | 280/732 |

*Primary Examiner*—William A. Cuchlinski, Jr.
*Assistant Examiner*—Olga Hernandez
*Attorney, Agent, or Firm*—Jimmy L. Funke

[57] ABSTRACT

An automotive supplemental inflatable restrain system has the ability to sense the presence of an occupant or the position of an infant seat and send that information to a control circuit at a low message rate, and to sense occupant position and send that data at a high rate. A protocol defines a low rate message interval large enough to contain a complete position message at high rate and still have room to transmit a logic state which is just one fragment of the low rate message, so that a plurality of message intervals will comprise one low rate message and many high rate messages.

8 Claims, 2 Drawing Sheets

DUAL RATE COMMUNICATION PROTOCOL

FIELD OF THE INVENTION

This invention relates to a method of simultaneous digital data communication at different rates and particularly to communication in a supplemental restraint system for transmitting occupant presence and occupant position data to a control circuit.

BACKGROUND OF THE INVENTION

The expanding use of supplemental inflatable restraints (SIRs) or air bags for occupant protection in vehicles increasingly involves equipment for the front outboard passenger seat. The driver side air bag has been deployed whenever an imminent crash is sensed. The position and size of the driver is fairly predictable so that such deployment can advantageously interact with the driver upon a crash. The passenger seat, however, may be occupied by a large or a small occupant including a baby in an infant seat. It can not be assumed that a passenger of any size is at an optimum position (leaning against or near the seat back). An infant seat is normally used in a rear facing position for small babies and in a forward facing position for larger babies and small children. While the forward facing position approximates the preferred position for air bag interaction, the rear facing position places the top portion of the infant seat close to the vehicle dash which houses the air bag. In the latter event, it is desirable to prevent deployment of the air bag. Moreover, if the passenger seat is unoccupied, it is desirable to prevent deployment to avoid the expense of replacing the air bag and repairing incidental damage due to deployment.

It has been proposed in U.S. Pat. No. 5,474,327 issued Dec. 12, 1995, entitled VEHICLE OCCUPANT RESTRAINT WITH SEAT PRESSURE SENSOR and assigned to the assignee of this invention, to incorporate pressure sensors in the passenger seat and monitor the response of the sensors by a microprocessor to evaluate the weight distribution and determine the type of occupant and the facing direction of an infant seat. Seat pressure sensors can to some extent determine the position of the occupant or distance from some reference point. Other means of detecting occupant position are also known. In any case the occupant position and presence sensors are likely to be remote from the SIR control circuit and it is necessary to address the communication of the presence and position data to the control so that the decision of when and whether to deploy can be made on the basis of current information.

A communication link between the sensing unit and the SIR control would be required to handle occupant presence information, occupant position information, or both, depending on the configuration of the SIR system. Occupant presence information is simple and would require a relatively slow update rate (seconds) since it would change infrequently and slowly, such as when an occupant exits the vehicle or when a small child crawls form one seat to another. The presence of an infant seat and whether it is facing the front or rear is also information which changes infrequently and slowly. Occupant position information, however, would be subject to continuous and more rapid change, and therefore requires a faster update (milliseconds). The type of information required to describe the position would likely be a discrete measured distance between an occupant and a reference point. Thus there is a dramatic difference in the information rate or bandwidth required between occupant presence and occupant position systems. Ordinarily, these divergent requirements would necessitate separate systems and communication techniques. It is preferred to have in place a communication system having the capability to accommodate either high or low bandwidth, or both simultaneously, and forego the expense of changing over or adding a new system when higher bandwidth is needed.

The expected progression of implementing SIR advances in vehicles would be to first introduce the simplest technology (occupant presence) followed later by more complex technology (occupant position). It is thus desirable to have a communication method which would permit the low bandwidth application for occupant presence to be serviced initially and to allow the high bandwidth application to be added (without further cost) when occupant position is introduced. With such an arrangement, a product supplied as a portion of a SIR system can be supplied to manufacturers of systems requiring either high or low message rates or both, the only change being setting a software configuration bit.

SUMMARY OF THE INVENTION

It is therefore an object of the invention to communicate at low and high bandwidths over the same communication link, particularly to supply occupant presence and/or position information to an SIR system. Another object in such communication is to implement low bandwidth communication alone at low cost but with the capability of accommodating a high bandwidth communication. A further object in such communication is to use high and low bandwidths separately or in combination.

A SIR system, as is well known, has a control unit comprising an acceleration sensor to detect an impending crash, a microprocessor to process the sensor signal and to decide whether to deploy an air bag, and a deployment unit fired by the microprocessor. An occupant detection system can determine if an occupant or infant seat is present and the position of an occupant. A communication link transfers the position and presence information to the control unit.

A combined protocol having both low and high bandwidth protocols can support both bandwidth needs separately or simultaneously. These protocols can be implemented on either uni-directional of bi-directional communication systems. The compound communication protocol consists of a low rate protocol for occupant presence information (including infant seat position) combined with a high rate protocol for occupant position information. Each protocol is based on a fundamental time interval (FTI) that defines the shortest meaningful time interval for that protocol. The low and high rate protocols are combined when the FTI for the high rate protocol is selected so that an entire high rate message can be contained within a single FTI for the low rate protocol. The low rate FTI has a period reserved for a high rate message; thus the high rate FTI must be short enough to permit sufficient intervals for the high rate message. The remainder of the low rate FTI is held at a high or low logic state which comprises a fragment of the low rate message. A variety of message structures and encoding techniques are suitable candidates for use with either protocol.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to a dual rate communication technique for use in SIR systems, it will be appreciated that the invention is applicable to communications in other environments.

Figure 1:
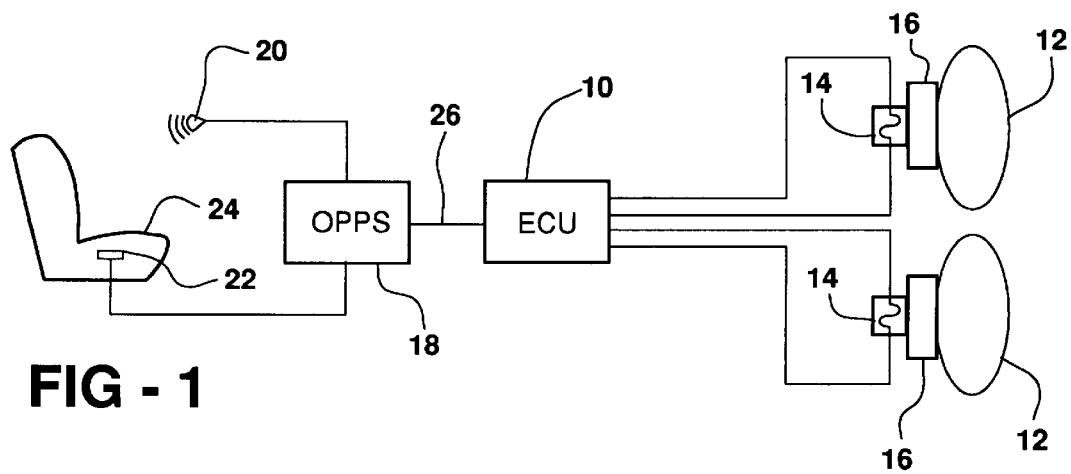
FIG. 1 is a schematic diagram of a SIR system with a communication link for occupant presence and position data.

Referring to FIG. 1, a SIR system includes an electronic control unit (ECU) 10 coupled to a pair of air bags 12 through firing circuits having a squib or initiator 14 which is fired by an electrical impulse and an inflator 16 which generates gas for rapid air bag inflation when the initiator is fired. One of the air bags is for the driver side and the other for the passenger side. An occupant presence and position sensing (OPPS) device 18 includes an ultrasonic sensor 20 situated to detect occupant position and a pressure sensor 22 in a vehicle seat 24, for example of the type disclosed in the above mentioned U.S. Pat. No. 5,474,327 for the detection of an infant seat presence and position. Information gleaned by the OPPS is encoded as digital data and transmitted over a communication link 26 to the ECU which uses the information to help determine whether and when to deploy the air bag for the passenger side.

The occupant presence data is updated only slowly while the position data is updated frequently and rapidly. This is accomplished on the communication link 26 by a combined protocol which has a low message rate protocol for the presence data and a high message rate protocol for the position data. The rules for combined protocol are:

1. Each component protocol must be based on a fundamental time interval (FTI); a low rate FTI (LFTI) for the occupant presence component, and a high rate FTI (HFTI) for the occupant position component.
2. The ratio of the LFTI to the HFTI must be great enough to allow at lest one complete high rate message to be contained within a single LFTI and leave sufficient time remaining within the LFTI that its state can be determined without ambiguity.

Figure 2:
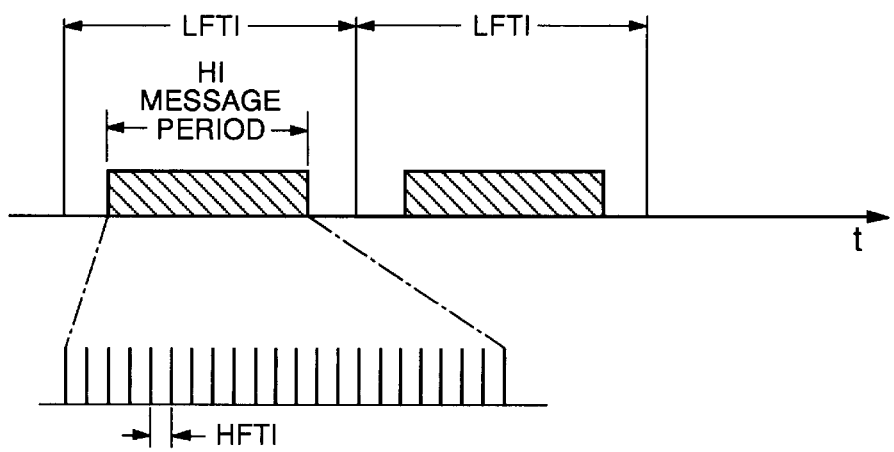
FIG. 2 is a diagram of combined high rate and low rate message protocols according to the invention.

This is illustrated in FIG. 2 which shows two consecutive LFTI intervals. Each LFTI has a nominal logic state which is interrupted by the high rate message. Each interval contains a period reserved to the high rate message; the period is somewhat shorter than the LFTI so that there is sufficient time for determining the state of the LFTI. The expanded message period shows that the period consists of many HFTI intervals affording sufficient bandwidth to contain at least one complete occupant position message.

The given rules for the combined protocol definition leave a high degree of flexibility for defining specific protocols for a given implementation. These rules can be used for uni-directional or bi-directional communication systems. They can also apply to systems using a single device or multiple devices in the OPPS subsystem. The above rules do not limit encoding techniques. Manchester, pulse width modulation, variable pulse width modulation, and other RZ or NRZ techniques can be employed for either the low or high rate component protocol. Further it is not necessary to use the same encoding technique for both component protocols, though it may simplify system design to do so. System architecture, bit rate, communication link drive, message structure and length, synchronization, and error detection are all issues which must be addressed in the definition of each component protocol in a specific application of the compound protocol technique.

Figure 3:
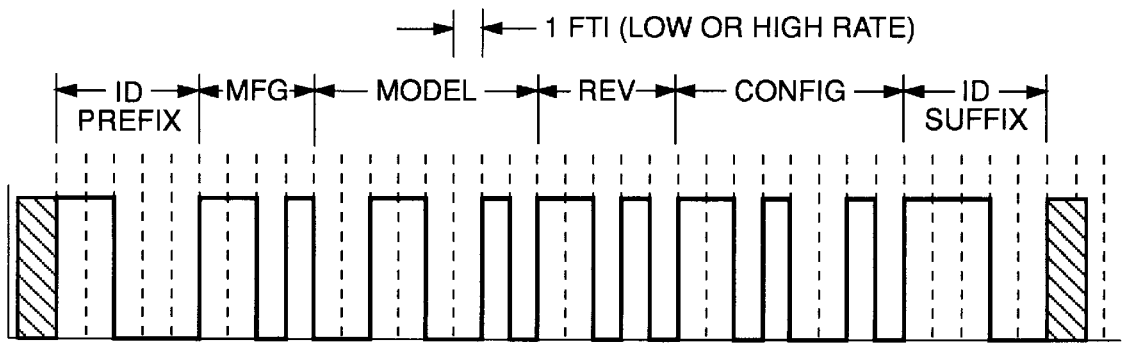
FIG. 3 is a waveform illustrating the structure of an ID message.

An example of a specific implementation is given to illustrate a protocol definition based on the above techniques and rules. The LFTI is chosen to be 50 ms and the HFTI is selected to be 500 μs. Then a high rate message comprising 54 FTIs will require only 27 ms and the remainder of the LFTI will be in a state required for the low rate message. Shortly after start up, an ID message will be transmitted twice on each protocol. This establishes the identity of the source at both the high an low message rate and thus allows a different source for each rate. Each protocol has an ID prefix of a high pulse two FTI wide followed by a low pulse three FTI wide, and a suffix of a high pulse three FTI wide and a low pulse two FTI wide. A value of 0 is represented by a pulse one FTI wide and a value of 1 is denoted by a pulse of either polarity two FTI wide. A sample ID message is shown in FIG. 3. In addition to the prefix and the suffix, the ID consists of a 3 bit manufacturer code, a 5 bit model identifier, a 4 bit revision code, and a 6 bit field specifying the configuration of the system. The same message structure is used for the high rate and the low rate protocols.

Following the ID messages, the low rate message contains the presence information which includes the position of an infant seat. Each condition is coded by a combination of high and low pulses according to the following table.

| CONDITION | LOW PULSE WIDTH | HIGH PULSE WIDTH |
| --- | --- | --- |
| Occupant Present | 1 | 1 |
| Occupant Not Present | 2 | 2 |
| Infant Seat Facing Rearward | 1 | 2 |
| Infant Seat Facing Forward | 2 | 1 |

Figure 4:
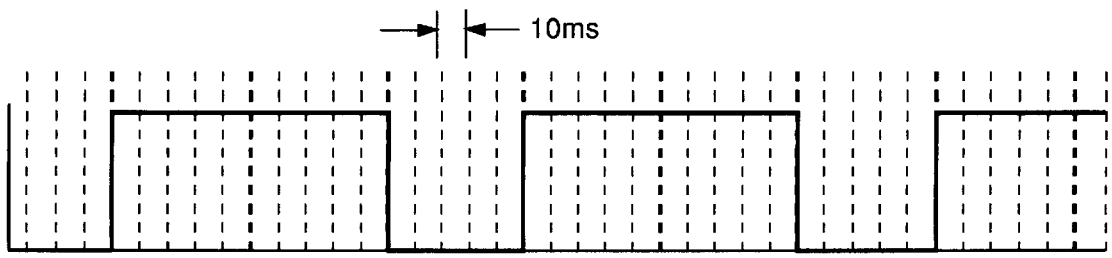
FIG. 4 is a waveform illustrating the structure of a low rate message.

Thus the low rate message is completed in two to four LFTIs or 100 ms to 200 ms. FIG. 4 depicts the signal for a rear facing infant seat (1 low and 2 high FTIs) which is continuously repeated. This message requires 150 ms and is continuously repeated.

Figure 5:
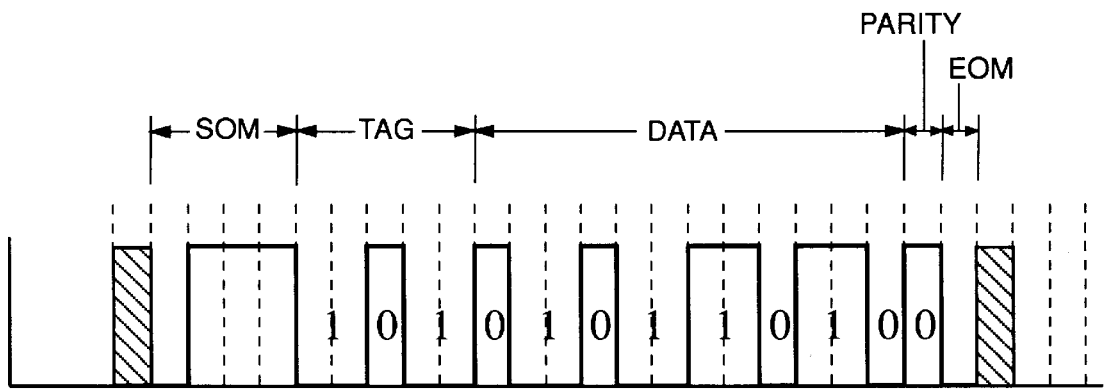
FIG. 5 is a waveform illustrating the detailed structure of a single high rate message.

The high rate message is more complex. An example shown in FIG. 5 includes 1) a start of message (SOM) symbol comprising a low pulse I HFTI wide followed by a high pulse 3 HFTI wide,
2) a tag (3 bits) identifying the type of data to follow,
3) the data (8 bits) representing the information identified by the tag, e.g., the distance between the driver and the steering column on a half centimeter scale,
4) a parity bit creating even parity, and
5) an end of message (EOM) symbol comprising a single low pulse 1 HFTI wide.

A maximum of 54 HFTIs or 27 ms is required for the complete message if the data bits were all ones, and less time is required when the message includes zeros.

Figure 6:
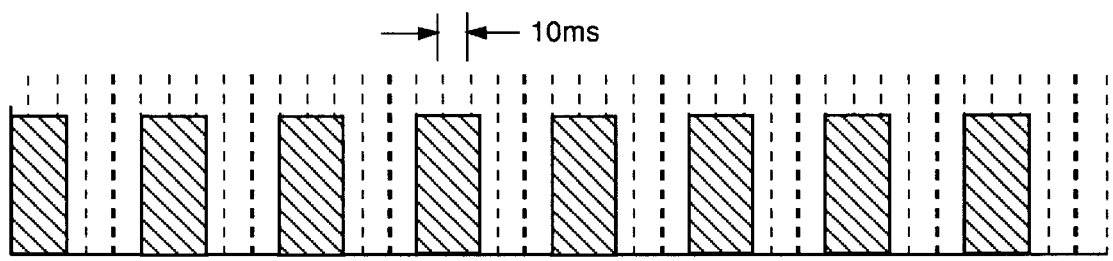
FIG. 6 is a waveform illustrating the positions of a plurality of successive high rate messages.
Figure 7:
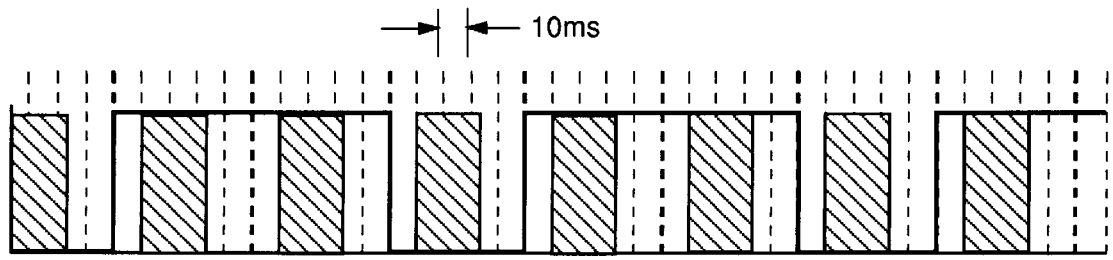
FIG. 7 is a waveform illustrating the structure of the messages of FIGS. 4 and 6 combined.

FIG. 6 shows a series of occupant position messages only, each message represented by a shaded block. FIG. 7 shows the presence and position messages of FIGS. 4 and 6 combined. Thus although the high rate messages override each LFTI, there is ample time to sample the state of each LFTI which carries a fragment of the low rate message. When the SOM symbol is recognized in a transmission, the high rate message can be read. Accordingly both low and high rate messages can coexist without compromise, allowing the high rate information to be rapidly and frequently transmitted and the low rate information to be sent less often. The low and high rate protocols may be used separately or simultaneously.

The embodiments of the invention in which an exclusive property or privilege is claimed are defined as follows:

1. In a supplemental restraint system having means for acquiring data on occupant presence and/or occupant position and a communication system for communicating such data to a control circuit, a method of accommodating communication of occupant presence data and/or occupant position data at different rates over a common communication link comprising the steps of:

establishing a series of message rate intervals on the common communication link;

devoting a first portion of each message rate interval to occupant presence data and reserving a second portion of each message rate interval for occupant position data;

the first portion being sufficient to accommodate only a fragment of a complete transmission of occupant presence data thereby requiring a series of message rate intervals for a complete transmission of occupant presence data;

establishing an occupant position message rate sufficient to accommodate a complete transmission of occupant position data within the second portion of each message rate interval; and transmitting the occupant presence and/or occupant position data in the respective portion of each message rate interval.

2. The method as defined in claim 1 wherein the step of transmitting the occupant presence data includes the step of:

encoding the occupant presence data by setting nominal logic states in the series of message rate intervals to values in accord with an occupant presence code.

3. The method as defined in claim 2 including:

sensing the presence of an occupant;

sensing the presence and position of an infant seat; and encoding occupant presence data by setting the nominal logic states of the series of message rate intervals to values representing the sensed presence and position in accord with said occupant presence code.

4. The method as defined in claim 2 wherein the step of transmitting the occupant position data includes the step of:

encoding the occupant position data by overriding said nominal logic states during the second portion of each message rate interval in accord with an occupant position code.

5. In a supplemental restraint system having means for acquiring data on occupant presence and/or position and a communication system for communicating such data to a control circuit, a method of communicating occupant presence data and occupant position data at different rates comprising the steps of:

establishing a low message rate interval for presence data;

devoting a first portion of each interval to low rate presence data and reserving a second portion of each interval for position data;

the first portion being sufficient for only a fragment of low rate presence data thereby requiring a plurality of consecutive intervals for complete presence data;

establishing a high message rate interval sufficient to accommodate a complete position data message within the second portion of each low message rate interval;

encoding occupant presence data into a message by setting the nominal logic states of successive intervals to values in accord with a code;

sensing occupant position to acquire position data;

encoding occupant position data at a high rate into said message by overriding said nominal logic states during the second portion of each interval; and transmitting said message.

6. A method of accommodating communication of first and second types of data at first and second message rates over a common communication link comprising the steps of:

establishing a message rate interval on the common communication link;

devoting a portion of each message rate interval to the first type of data and reserving a remaining portion of each message rate interval for the second type of data;

providing the first type of data at a first message rate sufficient to form a complete message within the devoted portion of each message rate interval;

providing the second type of data at a second message rate sufficient to form only a fragment of a complete message in the remaining portion of each message rate interval, thereby requiring a plurality of consecutive message rate intervals to form a complete message of the second type of data; and transmitting at least one of the first and second types of data in the respective portions of each message rate interval.

7. The method as defined in claim 6 including encoding the second type of data on a plurality of successive message rate intervals by setting each bit of the message rate interval to a nominal logic state.

8. The method as defined in claim 7 including encoding a complete message of the first the of data on a message rate interval by overriding the nominal logic state in the devoted portion to impose a series of logic pulses representing the first type of data.

* * * * *